(12) United States Patent
Wehinger

(10) Patent No.: US 8,660,167 B2
(45) Date of Patent: Feb. 25, 2014

(54) DEVICE AND METHOD FOR DISTORTION-ROBUST DECODING

(75) Inventor: Joachim Wehinger, Taufkirchen (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1017 days.

(21) Appl. No.: 12/693,089

(22) Filed: Jan. 25, 2010

(65) Prior Publication Data

US 2011/0182329 A1    Jul. 28, 2011

(51) Int. Cl.
*H04B 1/00*    (2006.01)

(52) U.S. Cl.
USPC ........... 375/147; 375/139; 375/130; 375/295; 375/316; 375/346; 375/259; 375/261; 375/260; 375/262; 375/265; 375/340

(58) Field of Classification Search
USPC ......... 375/147, 139, 130, 295, 316, 346, 259, 375/261, 260, 262, 265, 340; 714/756, 786, 714/792, 794, 795
See application file for complete search history.

(56) References Cited

U.S. PATENT DOCUMENTS

| | | | |
|---|---|---|---|
| 6,175,588 B1 | 1/2001 | Visotsky et al. | |
| 6,763,075 B2 | 7/2004 | Zhengdi et al. | |
| 7,003,029 B2 | 2/2006 | Doetsch et al. | |
| 7,027,533 B2 | 4/2006 | Abe et al. | |
| 7,092,706 B2 | 8/2006 | Yang | |
| 7,428,267 B2 | 9/2008 | Lee et al. | |
| 7,676,009 B2 | 3/2010 | Yen et al. | |
| 7,684,526 B2 | 3/2010 | Li et al. | |
| 7,937,643 B1 | 5/2011 | Chang et al. | |
| 8,306,000 B2 | 11/2012 | Mouhouche | |
| 2002/0126748 A1 | 9/2002 | Rafie et al. | |
| 2005/0180534 A1 | 8/2005 | Brotje et al. | |
| 2008/0160912 A1 | 7/2008 | Kim et al. | |
| 2008/0310568 A1 | 12/2008 | Sander | |
| 2009/0031185 A1 | 1/2009 | Xhafa et al. | |
| 2009/0245091 A1* | 10/2009 | Lin et al. | 370/210 |
| 2009/0296798 A1* | 12/2009 | Banna et al. | 375/229 |
| 2010/0027701 A1* | 2/2010 | Choi et al. | 375/265 |
| 2010/0180173 A1 | 7/2010 | Batra et al. | |

FOREIGN PATENT DOCUMENTS

| | | |
|---|---|---|
| CN | 1204189 A | 1/1999 |
| CN | 1705237 A | 12/2005 |
| CN | 1711712 A | 12/2005 |

OTHER PUBLICATIONS

Tao Shi; et al., "Combining Techniques and Segment Selective Repeat on Turbo coded Hybrid ARQ", Wireless Communications and Networking Conference, 2004, WCNC 2004 IEEE, vol. 4, No., pp. 2115-2119, Mar. 21-25, 2004.
Office Action in connection with U.S. Appl. No. 12/686,791 dated Jul. 10, 2012.

(Continued)

*Primary Examiner* — Zewdu Kassa
(74) *Attorney, Agent, or Firm* — Eschweiler & Associates, LLC

(57) ABSTRACT

A device for decoding code symbols which are interfered with a distortion during a predetermined distortion time interval includes a reliability information generator to provide reliability information based on the code symbols and a decoder to decode the code symbols into code words. The decoder is configured to decode the code symbols based on weighted reliability information, wherein the weighted reliability information is generated from the reliability information by applying a first weight during times not coinciding with the distortion time interval, and by applying a second weight different from the first weight during times coinciding with the distortion time interval.

21 Claims, 8 Drawing Sheets

(56) References Cited

OTHER PUBLICATIONS

Final Office Action dated Jan. 18, 2013 for U.S. Appl. No. 12/686,791.
U.S. Appl. No. 12/686,791, filed Jan. 13, 2010, 59 pages.
Low Complexity Stopping Criteria for UMTS Turbo-Decoders, Frank Gilbert, Frank Kienle, and Norbert When, Microelectronic System Design Research Group. University of Kaiserslautern, 5 pgs.
"Multi-User Detection for Improving VoIP Capacity and Coverage in WCDMA Uplink", Y.-P. Eric Wang and Stephen J. Grant, Ericsson Research, 5 pgs.
"Advanced receiver for WCDMA terminal platforms and base stations", Gregory E. Bottomley, Douglas A. Cairns, Carmela Cozzo, Tracy L. Fulghum, Ali S. Khayrallak, Per Lindell, Magnus Sundelin, and Y.-P. Eric Wang, Ericsson Review No. 2, 2006, pp. 54-58.
Office Action dated May 20, 2013 for U.S. Appl. No. 12/686,791.
Notice of Allowance in connection with U.S. Appl. No. 12/686,791 dated Oct. 7, 2013.

* cited by examiner

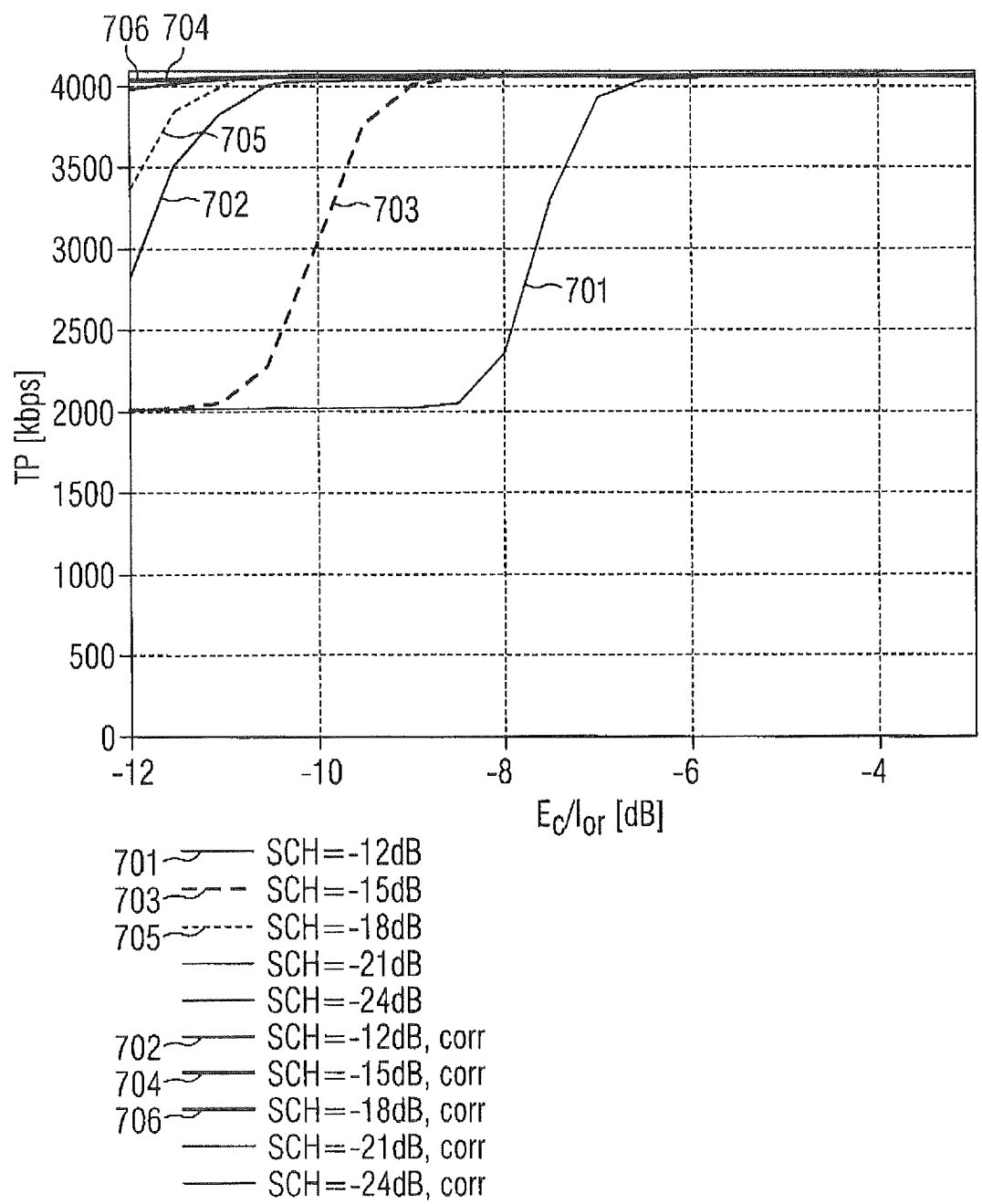

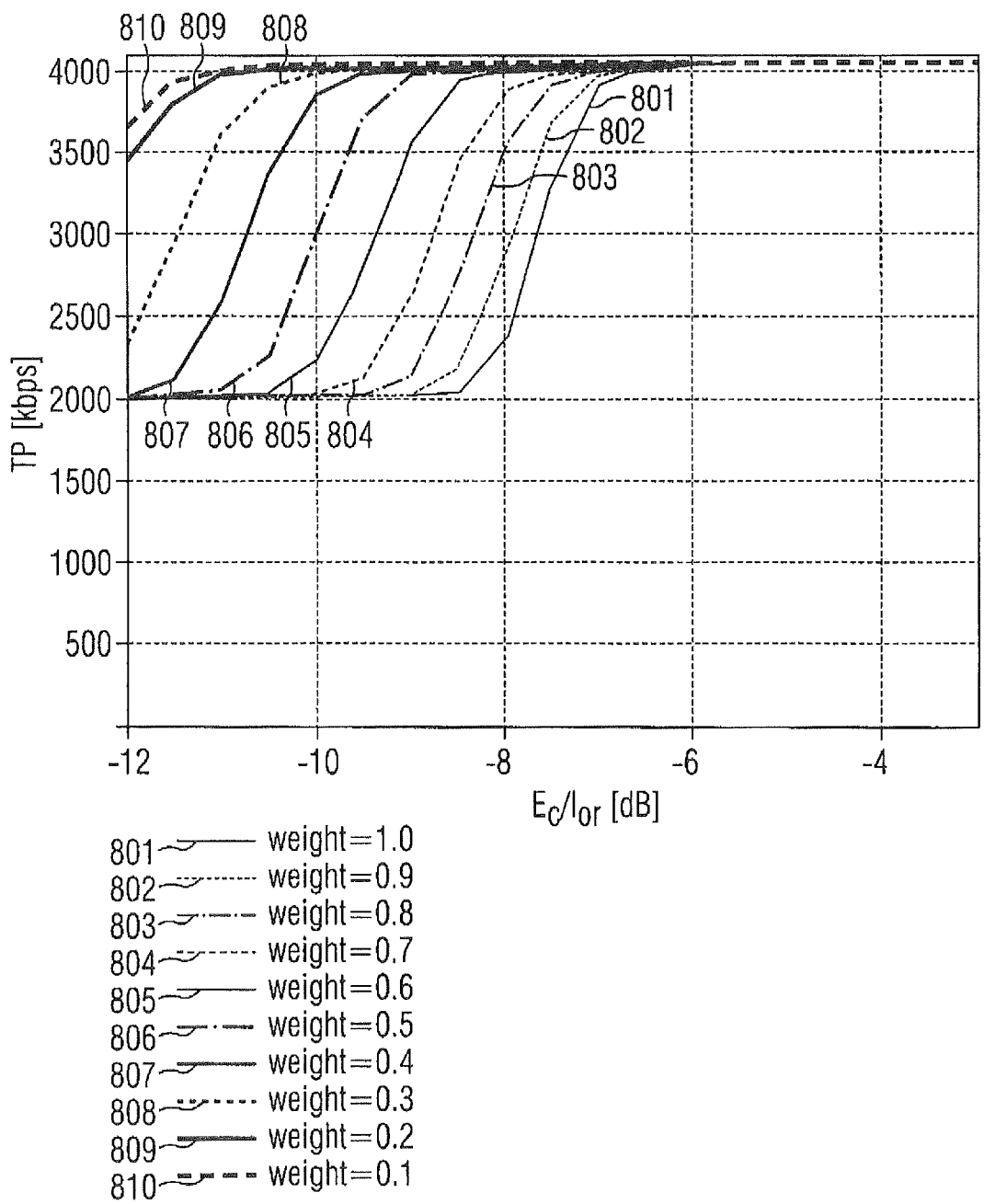

DEVICE AND METHOD FOR DISTORTION-ROBUST DECODING

FIELD OF THE INVENTION

This invention relates to decoding, and more particularly to a technique for distortion-robust decoding of a code signal which is interfered with a distortion.

BACKGROUND OF THE INVENTION

In mobile communications a user equipment (UE) receives control and data information by a mobile station (MS). The mobile station additionally transmits synchronization information using, for example, an independent synchronization channel. This synchronization information acts as a distortion to the receiving of control and data information, thus reducing throughput rates of the communication.

In the downlink of UMTS, for example, the reception of a High Speed Shared Control Channel (HS-SCCH) and a High Speed Physical Downlink Shared Channel (HS-PDSCH) is corrupted by primary and secondary common synchronization channels (P-SCH and S-SCH) that are transmitted by a Node-B (i.e. base station). The synchronization information of the SCH channels is not orthogonal to the information of the data and control channels and is burst-like in time causing an increased level of interference. To reduce or cancel this interference, a deterministic reconstruction of the SCH channels on chip-level or even on sub-chip-level is applied in the mobile terminal in order to subtract the reconstructed SCH channels from the control/data channels. This deterministic SCH cancellation requires an accurate power estimate and a subtraction circuit. For these and other requirements, a mobile terminal of high computational power is needed, which is expensive to produce and may have a high power consumption.

For these and other reasons there is a need for improvements in interference reduction.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 7 shows a diagram schematically illustrating data throughput versus signal-to-noise ratio depending on a distortion power for a UMTS receiver according to one embodiment.

FIG. 8 shows a diagram schematically illustrating data throughput versus signal-to-noise ratio depending on a weight of the LLR for a UMTS receiver according to one embodiment.

DETAILED DESCRIPTION OF THE INVENTION

Figure 1:
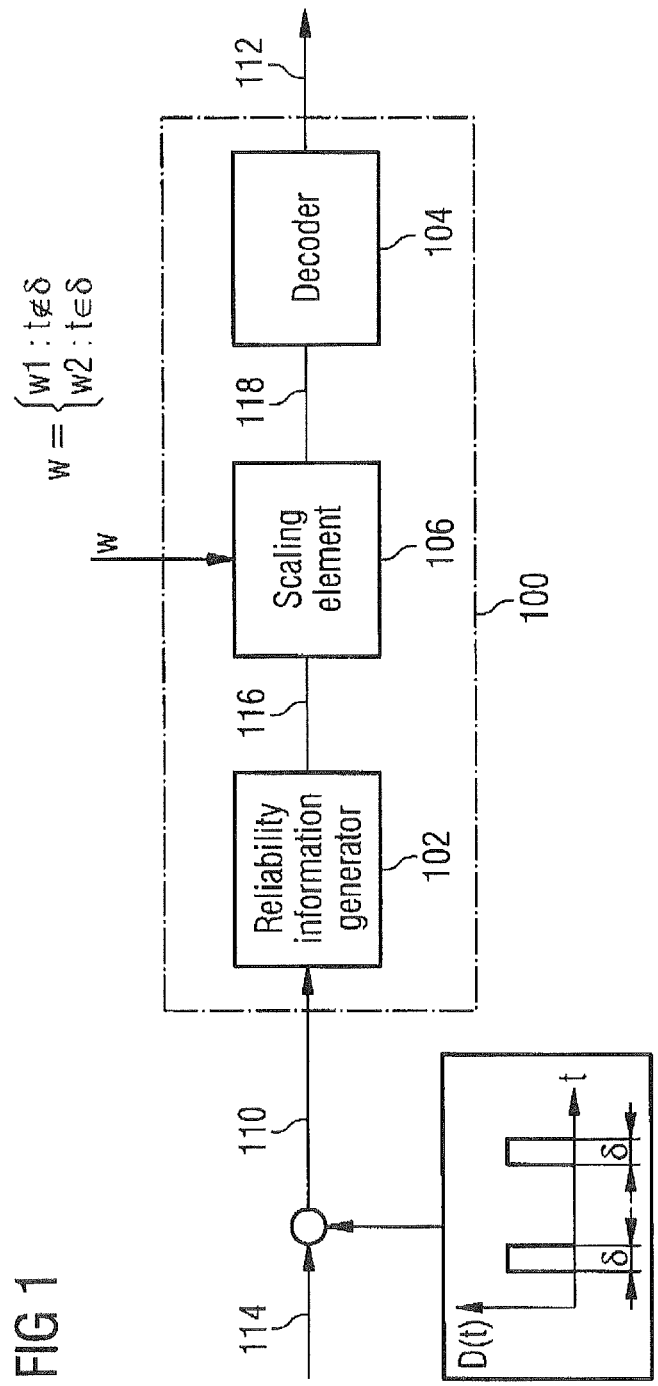
FIG. 1 schematically illustrates a device according to one embodiment.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

As employed in this Specification, the terms "coupled" and/or "electrically coupled" are not meant to mean that the elements must be directly coupled together; intervening elements may be provided between the "coupled" or "electrically coupled" elements.

Devices for decoding code symbols including reliability information generators and decoders are described below.

A code is a rule for converting a piece of information into another form of representation. Encoding is the process by which information from a source is converted into code symbols to be communicated. Decoding is the reverse process, converting these code symbols back into information understandable by a receiver. By decoding, received messages are translated or mapped into code words of a given code. These methods are often used to recover messages or signals sent over a noisy channel, e.g. radio signals sent over a radio channel.

Data may be coded by block coding or convolutional coding. Block codes work on fixed-size blocks (packets) of bits or symbols of predetermined size. Convolutional codes work on bit or symbol streams of arbitrary length. Block coding may, for example, be Reed-Solomon coding, Golay, BCH (Bose-Chaudhuri-Hocquenghem), multidimensional parity or Hamming coding. Block and convolutional codes may be combined in concatenated coding schemes.

Codes may be used to represent data in a way more resistant to errors in transmission or storage. Such a code is called an error-correcting code, and works by including carefully crafted redundancy with the stored (or transmitted) data. Examples include Hamming codes, Reed-Solomon, Reed-Muller, Bose-Chaudhuri-Hochquenghem, Turbo, Golay, Goppa, low-density parity-check (LDPC) codes, and space-time codes. Error detecting codes can be optimized to detect burst errors, or random errors. Decoders may use one of these codes to decode a code symbol. In particular, decoders may be turbo decoders, low-density parity-check (LDPC) decoders or other decoders exploiting reliability information.

LDPC codes are a class of linear block codes. Their parity check matrices contain only a few 1's in comparison to the number of 0's. They provide a performance which is very close to the capacity and use linear time complexity algorithms for decoding. Turbo coding is a scheme that combines two or more relatively simple convolutional codes and an interleaver to produce a block code that can closely approach the channel capacity (within a fraction of a decibel of the Shannon limit).

Reliability information generators generate reliability information for code words. Reliability information or likelihood information can for instance be LLR (logarithmic likelihood ratio) values, APP (a posteriori probability) values or probability values. The likelihood information may be bit-based such that for individual bits $b=\{+1,-1\}$ of the code words likelihood information may be determined according to the following equation:

$$\ddot{e}=\log(p[b=+1]/p[b=-1])=\log(p/(1-p)), \qquad (1)$$

wherein $p[b=+1]=p$ is the probability of interpreting an individual data bit b as +1 and $p[b=-1]=1-p$ is the probability of interpreting an individual data bit b as -1. The likelihood information ë is denoted as the logarithm of the likelihood ratio (LLR). The absolute values of the likelihood information of different individual bits of a detected data symbol may be added to provide a sum reliability information.

The devices described below may be designed in one embodiment for implementing the UMTS (Universal Mobile Telecommunications System) standard, e.g. one of the Release 99, 4, 5, 6, 7, 8 and 9 or higher versions of the UMTS standard. The devices may, in one embodiment, implement a HSPA (High Speed Packet Access) mobile telephony protocol, such as HSDPA (High Speed Downlink Packet Access) and HSUPA (High Speed Uplink Packet Access). The devices may implement the HSPA+ (Evolved HSPA) standard. The devices may be designed in one embodiment to implement the WCDMA (Wideband Code Division Multiple Access) standard. The devices may be designed to implement the LTE (Long Term Evolution) mobile communications standard, the E-UTRAN (Evolved Universal Terrestrial Radio Access Network) standard, the HSOPA (High Speed Orthogonal Frequency Division Multiplex Packet Access) standard or the Super 3G standard defined by 3GPP (Third Generation Partnership Project) standardization organization. Further the devices may be designed in one embodiment to implement WiMAX (Worldwide Interoperability for Microwave Access) according to the industrial consortium developing test strategies for interoperability or the IEEE (Institute of Electrical and Electronics Engineers) 802.16 (wireless MAN) and 802.11 (wireless LAN) standards. The devices described in the following may also be designed to implement other standards and all such variations are contemplated by the present invention.

The devices may include integrated circuits and/or passives. The integrated circuits may be manufactured by different technologies and may, for example, be designed as logic integrated circuits, analog integrated circuits, mixed signal integrated circuits, memory circuits or integrated passives.

Code symbols that are interfered with due to distortion during a time interval are described below.

The distortion time interval described below may depend on parameters defined by the mobile communications standard, e.g. the chip rate or the symbol rate. In CDMA, a chip is a pulse of a direct-sequence spread spectrum (DSSS) code, such as a pseudo-noise code sequence used in direct-sequence code division multiple access (CDMA) channel access techniques. In a binary direct-sequence system, each chip is typically a rectangular pulse of +1 or −1 amplitude, which is multiplied by a data sequence (similarly +1 or −1 representing the message bits) and by a carrier waveform to make the transmitted signal. The chips are therefore just the bit sequence out of the code generator; they are called chips to avoid confusing them with message bits. The chip rate of a code is the number of pulses per second (chips per second) at which the code is transmitted or received. The chip rate is larger than the symbol rate, meaning that one symbol is represented by multiple chips. The ratio is known as the spreading factor (SF) or processing gain.

The symbol rate is the number of symbol changes (signaling events) made to the transmission medium per second using a digitally modulated signal, e.g. modulated by QAM or QPSK. A symbol is a state or significant condition of the communication channel that persists for a fixed period of time. A sending device places symbols on the channel at a fixed and known symbol rate, and the receiving device has the job of detecting the sequence of symbols in order to reconstruct the transmitted data. In CDMA systems the term symbol may refer to one information bit or a block of information bits that are modulated using a modulation scheme, for example QAM, before the CDMA spreading code is applied.

UMTS receivers for receiving radio signals may include equalizers or Rakes, demodulators, descramblers, despreaders, LLR generators, turbo decoders and channel estimators for receiving radio signals and are described below.

UMTS receivers are designed for implementing the UMTS (Universal Mobile Telecommunications System) standard, e.g. one of the Release 99, 4, 5, 6, 7, 8 and 9 or higher versions of the UMTS standard. The UMTS receivers may implement a HSPA (High Speed Packet Access) mobile telephony protocol, such as HSDPA (High Speed Downlink Packet Access) and HSUPA (High Speed Uplink Packet Access).

UMTS receivers may include integrated circuits or passives. The integrated circuits may be manufactured by different technologies and may, for example, be designed as logic integrated circuits, analog integrated circuits, mixed signal integrated circuits, memory circuits or integrated passives.

Radio signals are radio frequency signals which are radiated by a radio transmitter (sender) with a radio frequency (RF) in the range of about 3 Hz to 300 GHz. This range corresponds to the frequency of alternating current electrical signals used to produce and detect radio waves. RF usually refers to oscillations in electrical circuits.

Equalizers are described below. They may use passive or active electronic components or digital algorithms to influence the frequency characteristics of the system. Radio channels in mobile radio systems are usually multipath fading channels, which cause intersymbol interference (ISI) in the received signal. To remove ISI from the signal, different types of equalizers can be used. Detection algorithms based on trellis search, e.g. MLSE (Maximum-Likelihood Sequence Estimation) or MAP (Maximum A-posteriori Probability), offer a good receiver performance but exhibit a high computational effort. Therefore, approximating algorithms which exhibit reasonable computational complexity, such as Rake, G-Rake, LMMSE (Linear Minimum Mean Squared Error), decorrelator/zero-forcer, SIC/PIC (Successive Interference Cancellation/Parallel Interference Cancellation), sphere-decoders or list-decoders are utilized. These detectors, however, typically require knowledge of the channel impulse response or the channel parameters, which can be provided by a channel estimator. A channel estimator is a device for estimating channel parameters of a transmission channel. Usually the channel estimation is based on a known sequence of bits, also specified as a sequence of pilot symbols, which is unique for a certain transmitter and which is repeated in every transmission burst. Thus the channel estimator is able to estimate the channel impulse response for each burst separately by exploiting the known transmitted bits and the corresponding received samples. The equalizer may include a combined adaptive Rake/G-Rake and equalizer structure, referred to as MMSE (minimum mean square error) algorithm to reduce multi-path destruction and ISI instead of a usual maximum ratio combining (MRC) Rake receiver.

Rakes and Rake receivers are described below. Rakes are Rake receivers or Generalized-Rake (G-Rake) receivers which exploit multi-path information of the received radio signal. A Rake can be utilized to counter the effects of multipath fading. This can be achieved by using several sub-equalizers or "fingers", that is, several correlators each assigned to a different multi-path component. Each finger independently equalizes a single multi-path component, and at a later stage the contribution of some or all fingers are combined in order to make use of the different transmission characteristics of each transmission path. This results is a higher signal-to-noise ratio in a multi-path environment. By using Rakes, different paths with different delays can be effectively combined to obtain the path diversity gain. Due to narrow transmission pulses and a large transmission bandwidth of the radio channel, the resulting inter-symbol interference (ISI) and a long delay spread in the characterization of the radio channel may be overcome by using the Rake.

Descramblers and Despreaders which are included in receivers, e.g. CDMA or UMTS receivers, are described below. Receivers are designed to receive radio signals sent by a transmitter, e.g. a CDMA or UMTS transmitter. In a CDMA or UMTS transmitter the information signal is modulated by a spreading code to make it a wideband signal and in the CDMA or UMTS receiver it is correlated with a replica of the same code by using a despreader and a descrambler. The spreading process actually consists of two phases, spreading and scrambling, and both of them use different types of codes with different characteristics. The spreading phase is also known as channelization. Channelization increases the bandwidth of the signal. The codes used in this phase are orthogonal codes. By way of example, UMTS uses orthogonal variable spreading factor (OVSF) codes. In an ideal orthogonal system the cross-correlation between the desired and the interfering orthogonal signals is zero. However, in a real system there are always some multi-path components by reflections and distractions of the same signal. These will distort the orthogonality. Moreover, the number of codes is finite and thus they have to be reused in every cell. Therefore, the same code can be allocated to different users in adjacent cells.

Scrambling is done after the spreading in the CDMA or UMTS transmitter, and descrambling, which is the inverse of scrambling, is done in a User Equipment (UE), e.g. a mobile phone, before the despreading, which is the inverse of spreading. The CDMA or UMTS receiver contains a descrambler which performs the descrambling and a despreader which performs the despreading.

In the scrambling process the code sequence is multiplied with a pseudorandom sequence of bits, i.e. the scrambling code. In the downlink direction each base station has a unique scrambling code, and in the uplink it is different for each UE. These are codes that are generated with good autocorrelation properties. The autocorrelation and cross-correlation functions are connected in such a way that it is in principal not possible to achieve good autocorrelation and cross-correlation values at the same time. A scrambling code can be either short or long. Short codes span over one symbol period, while long codes span over several symbol periods. The CDMA or UMTS receiver uses pseudorandom scrambling codes to reduce inter-base-station interference. Each Node B has only one unique primary scrambling code, and this is used to separate various base stations.

Demodulators included in receivers, e.g. CDMA or UMTS receivers are described below. By way of example, the modulation scheme (constellation) in the UMTS transmitters and receivers is quadrature phase shift keying (QPSK), and 16QAM on the HS-PDSCH channel. In later UMTS versions, higher modulation schemes can be used, for example 256QAM. Modulation is a process where the transmitted symbols are multiplied with the carrier signal obtaining a signal to be transmitted. Demodulation is the inverse process multiplying the received signal with the carrier signal to obtain the original transmitted symbols. The modulating symbols are called chips, and their modulating rate may for instance be 3.84 Mcps.

Decoders, in particular turbo decoders and LLR generators are described below. A turbo decoder decodes code symbols into code words by using a turbo code. Turbo codes are a class of high-performance forward error correction (FEC) codes, which were the first practical codes to closely approach the channel capacity, a theoretical maximum for the channel noise at which reliable communication is still possible for a given code rate. Turbo codes are finding use in CDMA communication systems such as e.g. UMTS, satellite communications and other applications where designers seek to achieve reliable information transfer over bandwidth or latency constrained communication links in the presence of data-corrupting noise. Turbo codes are nowadays competing with LDPC codes, which provide similar performance.

A turbo encoder sends three sub-blocks of bits. The first sub-block is the m-bit block of payload data. The second sub-block is n/2 parity bits for the payload data, computed using a recursive systematic convolutional code (RSC code). The third sub-block is n/2 parity bits for a known permutation of the payload data, again computed using an RSC convolutional code. Thus, two redundant but different sub-blocks of parity bits are sent with the payload. The complete block has m+n bits of data with a code rate of m/(m+n). The permutation of the payload data is carried out by a device called an interleaver. Hardware-wise, this turbo-code encoder consists of two identical encoders, which are connected to each other using a concatenation scheme, called parallel concatenation.

Before transmission of the complete block generated by the turbo encoder a puncturing device may be used for rate matching. This puncturing device may remove certain bits from the payload data or from the redundant sub-blocks of parity bits to reduce the data rate of the data block to be transmitted. Alternatively, a repetition device may be used for rate matching, which may repeat certain bits from the payload data or from any of the two redundant sub-blocks of parity bits to increase the data rate of the data block to be transmitted. Puncturing and repetition may be performed together, such that non-integer data rates may be realized. At the receiver side de-puncturing or de-repetition devices may be needed to perform re-mapping of the received bits to their original addresses before decoding. A de-puncturing device may re-map the bits to their original addressing and embed zeros in locations for the punctured bits. A de-repetition device may remove repeated bits which were inserted by the repetition device to reconstruct the original data block which may be provided to the decoder.

The turbo decoder may be built in a similar way as the turbo encoder—two elementary decoders are interconnected to each other, but in serial way, not in parallel. The first decoder operates on lower speed, thus, it is intended for the first encoder, and the second decoder is for the second encoder correspondingly. The first decoder yields a soft decision (i.e. reliability data) which causes a first delay. The same first delay is caused by the delay line in the first encoder. The second decoder's operation causes a second delay.

The LLR (logarithmic likelihood ratio) generator, which may be a turbo decoder front-end, may produce an integer for each bit in the data stream. This integer is a measure of how likely it is that the bit is a 0 or 1 and is also called soft bit or reliability information. The integer may for example be drawn from the range [−127, 127], where −127 means "certainly 0", −100 means "very likely 0", 0 means "it could be either 0 or 1", 100 means "very likely 1", 127 means "certainly 1" etc. This introduces a probabilistic aspect to the data-stream from the LLR generator, but it conveys more information about each bit than just 0 or 1. For example, for each bit, the front end of a turbo decoder has to decide if an internal voltage is above or below a given threshold voltage level. For a turbo-code decoder (turbo decoder), the front end (or the LLR generator) would provide an integer measure of how far the internal voltage is from the given threshold.

To decode the m+n-bit block of data, the turbo decoder front-end creates a block of likelihood measures, with one likelihood measure for each bit in the data stream. There are two parallel decoders, one for each of the n/2-bit parity sub-blocks. Both decoders use the sub-block of m likelihoods for the payload data. The decoder working on the second parity sub-block knows the permutation that the coder used for this sub-block. Each of the two decoders generates a hypothesis (with derived likelihoods) for the pattern of m bits in the payload sub-block. The hypothesis bit-patterns are compared, and if they differ, the decoders exchange the derived likelihoods they have for each bit in the hypotheses. Each decoder incorporates the derived likelihood estimates from the other decoder to generate a new hypothesis for the bits in the payload. Then they compare these new hypotheses. This iterative process continues until the two decoders come up with the same hypothesis for the m-bit pattern of the payload, typically in 15 to 18 cycles.

FIG. 1 schematically illustrates a device according to one embodiment. The device 100 contains a reliability information generator 102 and a decoder 104 which are coupled by a scaling element 106 connected between the reliability information generator 102 and the decoder 104. The device 100 receives code symbols 110 at an input which is an input to the reliability information generator 102 and provides code words 112 at an output which is an output of the decoder 104.

The code symbols 110 are interfered with a distortion D(t), wherein the distortion occurs during a time interval of distortion δ (delta). This time interval δ may be a time interval δ of predetermined length δ. It may further be a periodic time interval with a period greater than δ, for example greater than two times the length of δ. It may have a length of ten times the length of δ, for example. The distortion D(t) may be a synchronization signal containing synchronization symbols during the time interval δ. The relative position of the synchronization symbols with respect to the code symbols may be configurable. For example, a delay may be applied to the code symbols to configure a desired time relation between synchronization symbols and code symbols. The symbols between subsequent time intervals δ (outside the time intervals δ) may be chosen such that original code symbols 114 are not distorted by the synchronization signal D(t) or at least less distorted than during time intervals of distortion δ (synchronization).

The level of distortion D(t) during the time intervals of distortion δ may vary, also the level of distortion D(t) may vary outside the time intervals of distortion δ. Typically, a level of D(t) inside δ is greater than a level of D(t) outside δ. D(t) may be periodic but it does not have to be. D(t) may be, for example, a non-periodic synchronization signal, e.g. a synchronization pulse indicating the start of an asynchronous transmission data packet, wherein a time difference between transmission of successive data packets is unknown. When the synchronization pulse is known to the device 100 the time interval of distortion (synchronization) δ can be determined by detecting the synchronization pulse in the code symbols 110.

D(t) may be a deterministic signal known to the device 100. δ may be determined by using a threshold for detecting a power of the known distortion signal D(t). A power of D(t) above that threshold indicates a start time for δ and a power of D(t) below that threshold indicates an end time of δ.

The reliability information generator 102 generates reliability information 116 based on the coded symbols 110. The reliability information 116 may be likelihood information, such as LLR (logarithmic likelihood ratio) values. The likelihood information may be bit-based such that for individual bits b={+1,−1} of the code words likelihood information may be determined according to equation (1) indicated above.

The scaling element 106 produces a weighted version of the reliability information 118. The weighted version of the reliability information 118 is generated by weighting the reliability information 116 with a weight w. The weight w may assume a first weight w1 during times not coinciding with the time interval δ of distortion and may assume a second weight w2 different from the first weight w1 during times coinciding with the time interval δ of distortion. Typically, the second weight w2 is smaller than the first weight w1. In other words, the reliability information 116 is weighted to account for less reliability during the time interval δ of distortion than outside of the time interval δ of distortion.

According to one embodiment, the scaling element 106 may for instance be implemented by a multiplier having a time variant multiplication factor w to multiply the reliability information 116 with weights w1 (outside the time interval of distortion δ) and w2 (during the time interval of distortion δ), where w1 and w2 are different from each other. In the following, for the sake of simplicity and without restriction of generality, it is assumed that w1=1 in one embodiment unless noted otherwise. The scaling element 106 may then be implemented such that during times t not coinciding with the time interval of distortion δ, the reliability information generator 102 is directly connected to the decoder 104 and during times t coinciding with the time interval of distortion δ, the reliability information generator 102 is connected to the decoder 104 via a weighting unit applying a weight w (corresponding to w2) lying within a range between 0 and 1, for example. According to one embodiment, the scaling element 106 could be implemented by a switching element (not shown) which is controlled by the time interval of distortion δ and which, in a first position, passes the reliability information 116 directly to the input of the decoder 104 and, in a second position, passes the reliability information 116 via a multiplier (multiplication factor w) to the input of the decoder 104.

The decoder 104 decodes the code symbols 110 into code words 112. If w1=1, the (unweighted) reliability information 116 is used during times not coinciding with the time interval of distortion δ (e.g. synchronization pulse) while the weighted version of the reliability information 118 is used during times coinciding with the time interval of distortion δ (e.g. synchronization pulse).

Figure 2:
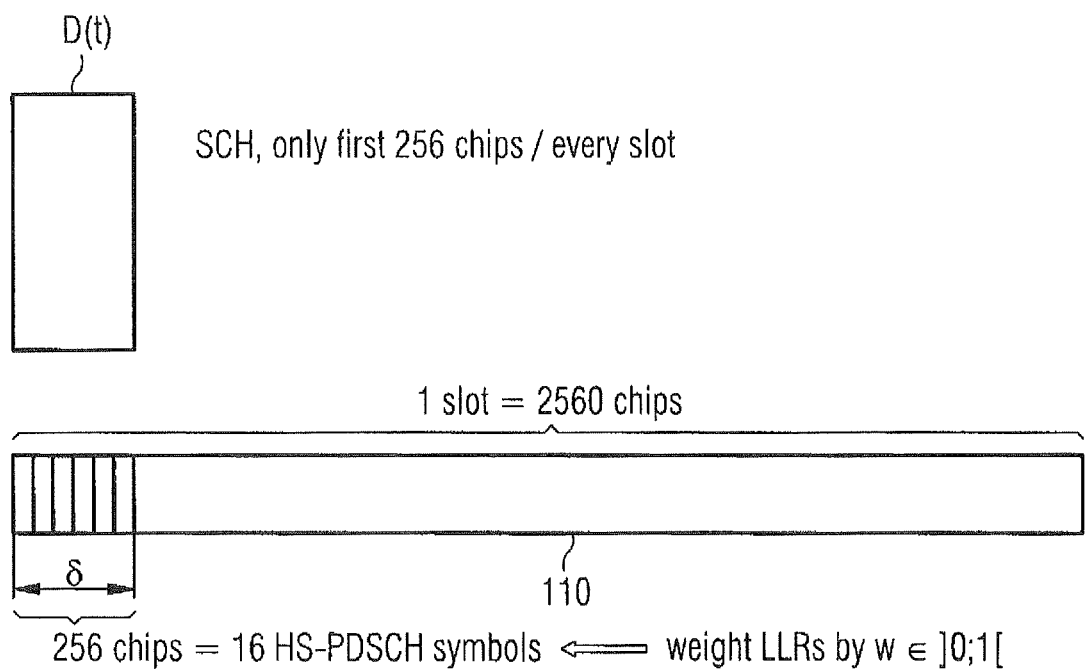
FIG. 2 schematically illustrates a code symbol interfering with a distortion during a time interval of distortion according to one embodiment.

FIG. 2 schematically illustrates code symbols interfered with a distortion during a predetermined distortion time interval according to one embodiment. The code symbols 110 are HS-PDSCH symbols transmitted by a HS-PDSCH channel (High Speed Physical Downlink Shared Channel) of a HSDPA communication link which code symbols 110 are distorted by synchronization symbols of a SCH channel (synchronization channel) of the HSDPA communication link. The distortion D(t) contains 16 HS-PDSCH symbols and has a length of 256 chips corresponding to the predetermined time interval of distortion δ. The code symbols 110 have a length of 2560 chips corresponding to one slot of the HS-PDSCH signal. The first 256 chips of the HS-PDSCH signal are interfered with the synchronization signal D(t) which contains the synchronization symbols of the SCH channel. Every slot of the HS-PDSCH signal is interfered with the synchronization symbols such that the predetermined interval of distortion δ has a length of 256 chips and is periodic with a period of 2560 chips. The SCH channel may consist of two sub channels, a primary SCH (P-SCH) and a secondary SCH (S-SCH) channel which may distort the HS-PDSCH signal. The HS-PDSCH channel and the SCH channel may be specified according to the 3GPP standard TS 25.211, e.g. version V5.8.0.

Reliability information (LLR values) based on the 16 HS-PDSCH symbols coinciding with the predetermined period of distortion (synchronization) δ are weighted by a weight $w^a$ [0;1] while reliability information (LLR values) based on HS-PDSCH symbols not coinciding with the predetermined period of distortion δ (not depicted in FIG. 2) are not weighted by the weight w.

Alternatively the code symbols 110 may be HS-SCCH symbols, i.e. control symbols, transmitted by a HS-SCCH channel (High Speed Shared Control Channel) of a HSDPA communication link distorted by the SCH channel. Alternatively the code symbols 110 may be DPCH symbols of a UMTS Release 99 DPCH (Dedicated Physical Channel) downlink channel, for example. The DPCH channel contains the DPDCH (Dedicated Physical Data Channel) data channel and the DPCCH (Dedicated Physical Control Channel) control channel. In the downlink direction data and control information may be handled in a time-multiplex-mode, for example. For the data part up to eight users, for example, may be packed together. For a particular configuration the location of data and control bits within a slot may be static, such that one particular user assigned to the data channel or specific control information parts assigned to the control channel are always allocated to the same segment in the slot. This segment may be a segment which is exposed to the distortion caused by the SCH channel. Hence, for that user/control information the LLR weighting can be applied to reduce the effects of the distortion. The DPCH channel can also be delayed with reference to the frame start, hence, also to the SCH channel. The delay can be configured, e.g. by pre-configuration of the system parameters, which may be chosen within a valid range.

The SCHs are not orthogonal to the information carrying CDMA signatures by construction. The SCH-distortion is bursty in time, meaning that every 256 first chips (and even more in case of a multi-path channel) of a UMTS-slot experience an increased level of interference. By a device 100 as depicted in FIG. 1 this interference may be suppressed such that system throughput is increased even in case of high code rates, high modulation order and high geometry factors.

The device 100 may additionally perform a deterministic SCH cancellation before feeding the code symbols 110 to the reliability information generator 102 to further improve system throughput. A deterministic SCH cancellation means that the SCH channels are reconstructed locally on a (sub-)chip-level in the mobile terminal. With an estimate of their power and the channel impulse response they are subtracted before or after the equalizer/Rake from the received/equalized signal before the data (HS-PDSCH) and control (HS-SCCH) information is despread and decoded (see FIGS. 3 and 4 described below). This requires an accurate power estimate of the SCH and a corresponding subtraction circuit on the chip- or sub-chip-level which may be included in the device 100.

Figure 3:
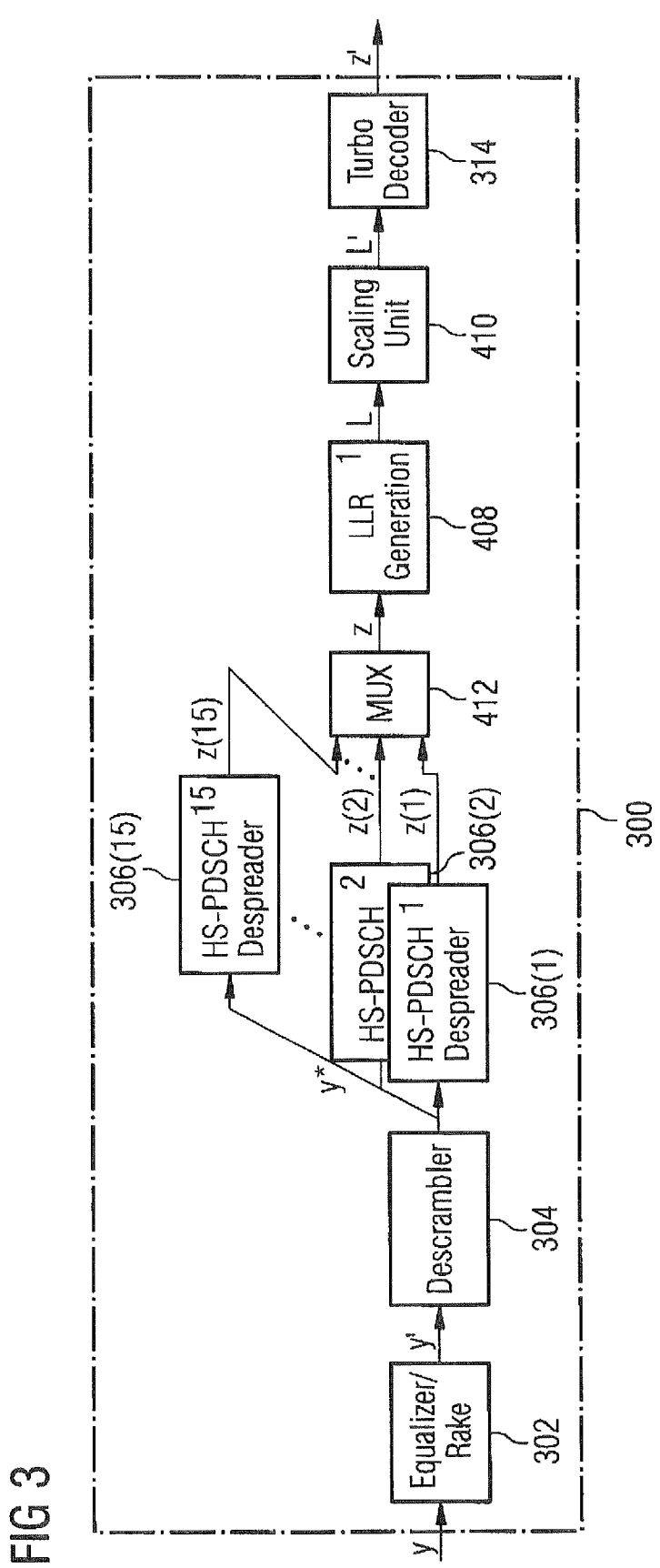
FIG. 3 schematically illustrates a UMTS receiver according to one embodiment.

FIG. 3 schematically illustrates a CDMA receiver according to one embodiment. By way of example and without restriction of generality, the CDMA receiver may be a UMTS receiver. The UMTS receiver 300 comprises an equalizer/rake unit 302, a descrambler 304, a plurality of e.g. fifteen despreaders 306(1), 306(2), . . . , 306(15), a multiplexer 412, a LLR generator 408, a scaling unit 410 and a decoder such as e.g. a turbo decoder 314.

The equalizer/rake unit 302 has an input to receive a radio signal y and an output connected to the descrambler 304 to provide an equalizer output signal y'. The descrambler 304 has an input to receive the equalizer output signal y' and an output, connected to each of the e.g. fifteen despreaders 306 (1), 306(2), . . . , 306(15), to provide a sequence of descrambled symbols y*. Each of the despreaders 306(1), 306(2), . . . , 306(15) has an input to receive the sequence of descrambled symbols y* and an output, connected to a respective input of a plurality of e.g. fifteen inputs of the multiplexer 412, to provide a respective sequence of despreaded symbols z(1), z(2), . . . , z(15). The multiplexer 412 multiplexes the e.g. fifteen sequences of despreaded symbols z(1), z(2), . . . , z(15) received at its inputs and provides a sequence of multiplexed despreaded symbols z at its output which is connected to the LLR generator 408. The LLR generator 408 has an input to receive the sequence of multiplexed despreaded symbols z and an output, connected to the scaling unit 410, to provide a sequence of LLR values L. The scaling unit 410 has an input to receive the sequence of LLR values L and an output, connected to the turbo decoder 314, to provide a sequence of scaled LLR values L'. The turbo decoder 314 has an input to receive the sequence of scaled LLR values L' and an output to provide a sequence of code words z' by decoding the sequence of multiplexed LLR values L'.

The equalizer/rake unit 302 may contain an equalizer or a Rake or a combined Rake and equalizer structure as described above and a demodulator as described above. The equalizer/rake unit 302 applies an equalization or Rake processing to the received signal y in order to reverse the effect of the multi-path channel and to coherently combine individual propagation paths.

The equalizer provides an equalized signal. The equalized signal is generated by performing an equalization operation of the radio signal y. The equalization operation may, for example, comprise of a convolution of the radio signal y with the inverse impulse response by using channel parameters known or estimated by the equalizer 302. The equalization operation may be implemented by a MLSE or MAP algorithm or by any other suitable algorithm which is able to reduce the computational complexity of the MLSE or MAP algorithm to a reasonable computational effort, such as e.g. algorithms like Rake, G-Rake, LMMSE, decorrelators, zero-forcers, SIC/PIC, sphere-decoders or list-decoders.

The Rake exploits multi-path information of the received radio signal y by using several sub-equalizers or "fingers", i.e. several correlators each assigned to a different multi-path component. Each finger independently equalizes a single multi-path component of the radio signal y. The contribution of all fingers are combined for obtaining a rake output signal.

The equalized signal or the rake output signal or a combination of both signals is received at an input of the demodulator (not depicted in FIG. 3) which demodulates this signal received at its input and provides the equalizer output signal y' at the output of the equalizer/rake unit 302. The demodulator demodulates the modulated signal received at its input by recovering the information content from the modulated signal. The demodulator may detect the amplitudes of in-phase and quadrature components of a baseband signal or the phase or frequency of an intermediate frequency signal. The demodulator may further map the quantized amplitudes, phases or frequencies to code symbols or demodulated data symbols. The code symbols may be parallel-to-serial converted into a bit stream provided at the output of the demodulator which is the output of the equalizer/rake unit 302. The demodulator may perform a 16 QAM, 64 QAM or higher modulation scheme, for example, or a QPSK or any PSK modulation scheme.

Figure 5:
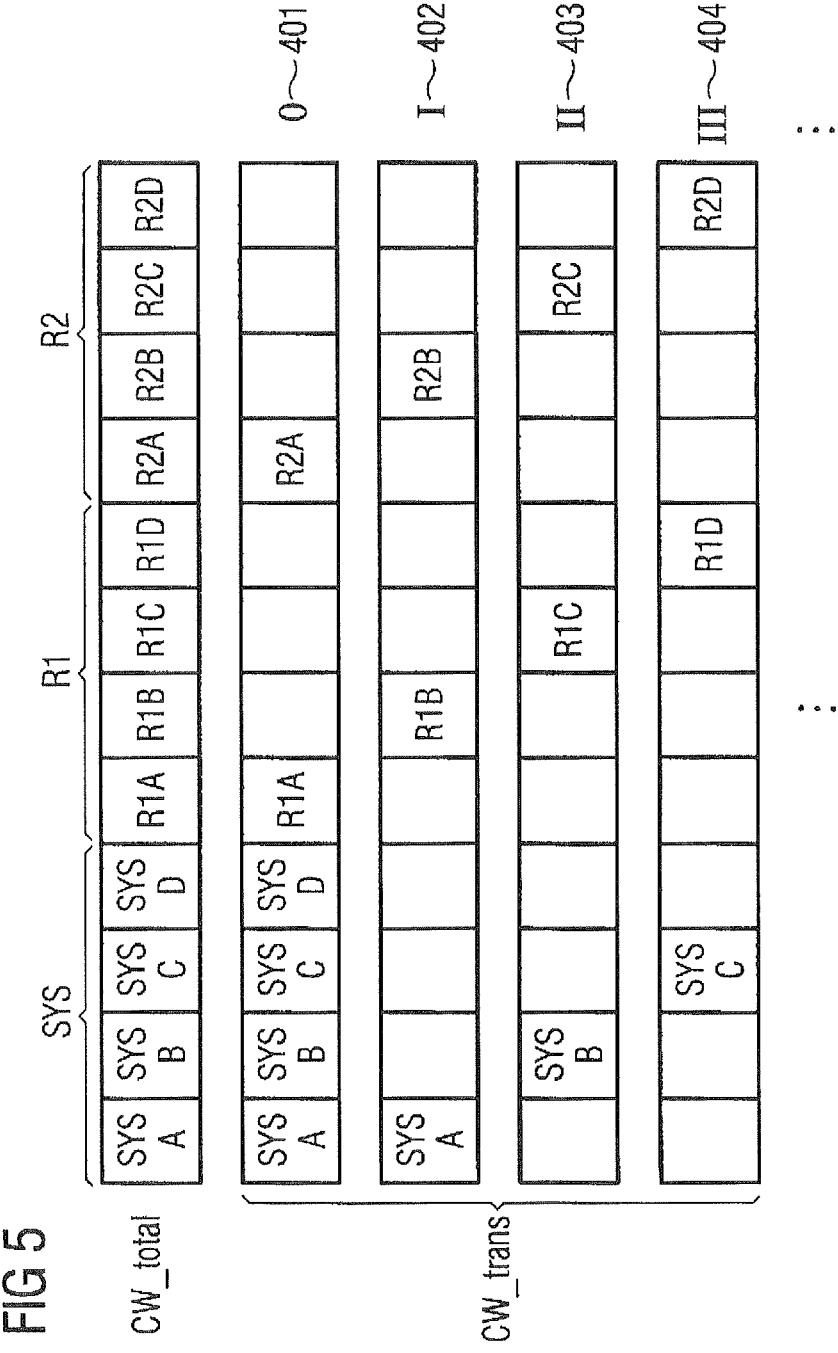
FIG. 5 schematically illustrates a redundancy version scheme of a radio signal according to one embodiment.

The equalizer/rake unit 302 receives the radio signal y which contains a sequence of data words, and the data words contain payload data symbols. The payload data symbols of the sequence of data words may be ordered according to a predefined redundancy scheme or redundancy version which is illustrated in FIG. 5. This allows the UMTS receiver 300 to apply error control for data transmission or forward error correction (FEC) to avoid retransmission or reduce a number of retransmissions.

The descrambler 304 descrambles the equalizer output signal y' by using a known scrambling code to provide the sequence of descrambled symbols y*. By this processing, the known scrambling modulation is removed that is unique to a Node-B. A descrambler 304 as described above is used which multiplies the equalizer output signal y' with a pseudorandom sequence of bits, i.e. the scrambling code. The scrambling code is a code which is unique to each base station or Node-B and which code has good autocorrelation properties to reduce inter-base-station interference.

Each of the despreaders 306(1), 306(2), . . . , 306(15) despreads the sequence of descrambled symbols y* obtaining a respective sequence of despreaded symbols z(1), z(2), . . . , z(15). In a UMTS transmitter channel-dependent information is modulated by a channel-dependent spreading code to provide the radio signal y as a wide-band signal. In the despreaders 306(1), 306(2), . . . , 306(15) of the UMTS receiver 300 the received signal is correlated with a replica of the same channel-dependent spreading code to reconstruct the original information of the respective channels included in the radio signal y. When using HSDPA there can be between 1 and 15 individual parallel HS-PDSCH channels assigned to a mobile terminal. Despreading is also known as dechannelization (the inverse of channelization) reducing the bandwidth of the received radio signal y. The spreading codes are orthogonal codes such that channel-dependent information included in the sequences of descrambled symbols y* may be reconstructed when the spreading codes are known in the UMTS receiver 300.

The LLR generator 408 generates an LLR value L based on the sequence of multiplexed despreaded symbols z received at its input. For each HS-PDSCH channel, soft information of the transmitted bits are formed from the sequence of multiplexed despreaded symbols z. This soft information also called soft bit or reliability information is a measure of how likely it is that a bit is a 0 or 1. It may be an integer, e.g. drawn from the range [−127, 127], where −127 means "certainly 0", −100 means "very likely 0", 0 means "it could be either 0 or 1", 100 means "very likely 1", 127 means "certainly 1" etc. The LLR generators 308(1), 308(2), . . . , 308(15) introduce a probabilistic aspect to the data-stream conveying more information about each bit than just 0 or 1.

The LLR generator 408 generates reliability information for code words. The LLR value L for the multiplexed i=1 . . . 15 HS-PDSCH channels can e.g. be determined according to the equation $L=\log(p[b_i=+1]/p[b_i=-1])$, wherein $p[b_i=+1]$ is the probability of interpreting an individual data bit $b_i$ of the sequence of multiplexed despreaded symbols z assigned to a respective HS-PDSCH channel i as +1 and $p[b_i=-1]$ is the probability of interpreting an individual data bit $b_i$ of the sequence of multiplexed despreaded symbols z assigned to a respective HS-PDSCH channel i as −1. The likelihood information L is denoted as the logarithm of the likelihood ratio (LLR). The absolute values of the likelihood information of different individual bits of a detected data symbol may be added to provide a sum reliability information.

The scaling unit 410 scales the sequences of LLR values L by multiplying them with a scaling factor or weighting them with a weight. The scaled LLR values L' for the multiplexed single HS-PDSCH channels can be determined according to the equation $L'=w*L$ for the first 256 chips in each slot and according to the equation $L'=L$ for the remaining 2560−256 chips in the slot, wherein w represents a weight or a scaling factor with a value in the interval [0;1]. According to FIG. 2 the first 256 chips in each slot are interfered with a distortion resulting from transmitted non-orthogonal symbols of the SCH channel. By applying the scaling procedure, an influence of LLR values associated with these distorted chips on the decoding is reduced resulting in a distortion-robust decoding performance with higher accuracy.

Alternatively, the scaled LLR value L' can be determined according to the equation $L'=L$ for the first 256 chips in each slot and according to the equation $L'=w*L$ for the remaining 2560−256 chips in the slot, wherein w represents the scaling factor with a value greater than 1. By applying this alternative scaling procedure an influence of LLR values associated with non-distorted chips on the decoding is over-weighted with respect to an influence of LLR values associated with distorted chips on the decoding. Also this kind of scaling results in better decoding performance. In general, as has been described in conjunction with FIG. 1, the scaling may be accomplished with two weights w1, w2, where w2 is smaller than w1 and, optionally, either w1 or w2 may be set to be equal to 1.

Figure 6:
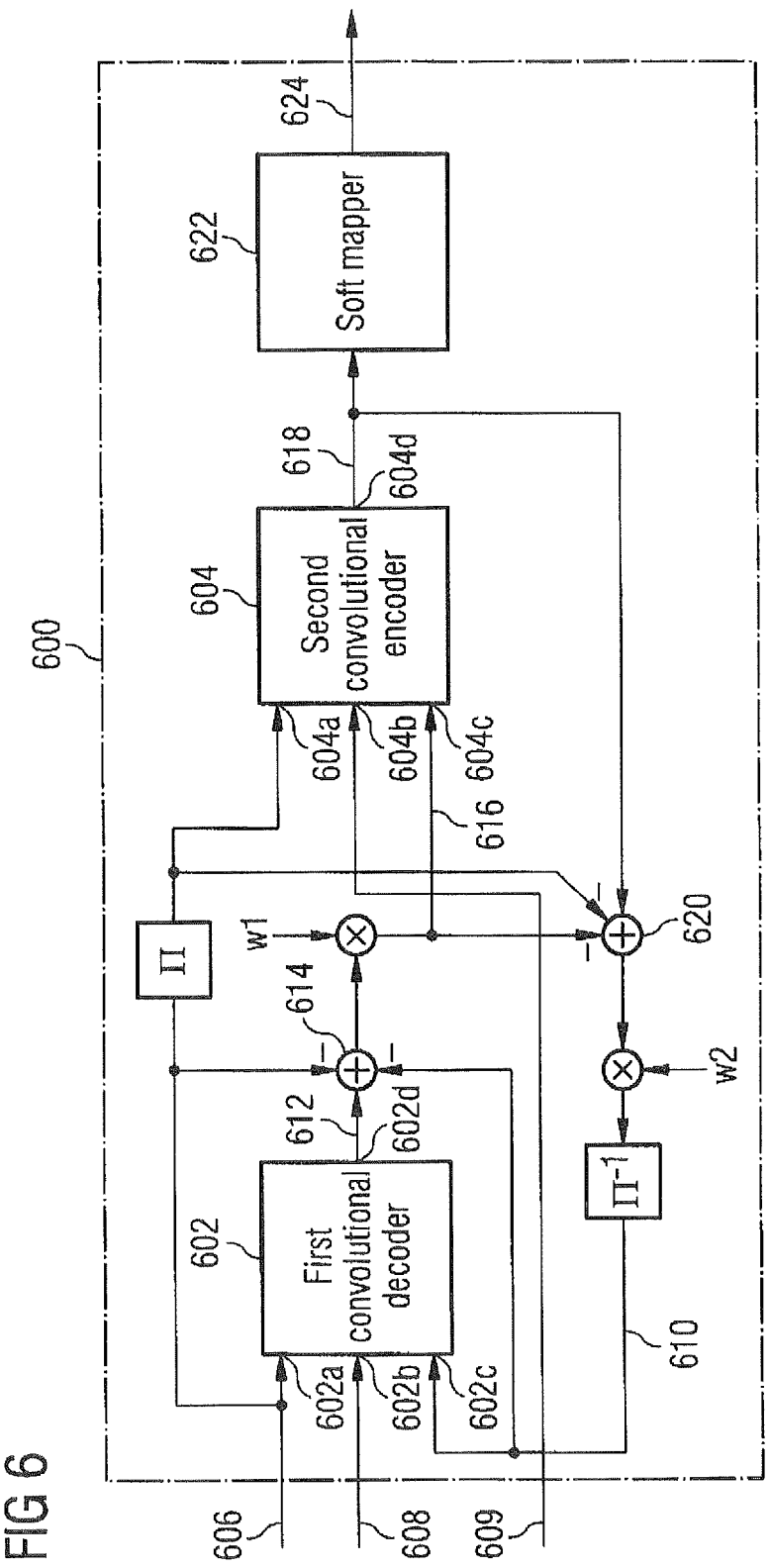
FIG. 6 shows a block diagram schematically illustrating a structure of a turbo decoder according to one embodiment.

The turbo decoder 314 decodes the code symbols into code words and may correspond to a turbo decoder 600 as depicted in FIG. 6 which will be described below.

The effectiveness of the LLR-weighting methods changes with the code rate which is a ratio of the systematic bits versus a total number of bits per code word. A code word contains systematic bits and redundant bits as illustrated in FIG. 5, for example, and described below. For low code rates the improvement is most pronounced while for high code-rates, e.g. maximum 0.97, the impact becomes less pronounced. Therefore, the weighting factor w may be increased when increasing the code rate in order to keep achieving high performances. In general, as has been described in conjunction with FIG. 1, the scaling may be accomplished with two weights w1, w2, wherein the ratio w2/w1 may be increased when increasing the code rate, and vice versa. The code rate may be varied by changing the relation between systematic information and redundant information in the generation of a code word coded by an encoder. The code rate may also be varied by changing a punctuation degree of a successive punctuation device which removes samples from the code symbols (punctuates the code symbols) provided by the encoder, thereby changing the relation between systematic information and redundant information.

Similarly the effectiveness of the LLR-weighting methods changes with the modulation scheme, e.g. QPSK, 16QAM, 64QAM, 256QAM etc. For high modulation schemes more symbols are transmitted per time interval which results in a higher capacity for transmitting redundant bits. As the number of redundant bits is increased the weighting factor w may be reduced, thereby attenuating the symbols associated with distorted chips to a higher degree. Thus, the weighting factor w may be reduced when increasing a degree of the modulation scheme to improve the accuracy. In general, as has been described in conjunction with FIG. 1, the scaling may be accomplished with two weights w1, w2, wherein the ratio w2/w1 may be reduced when increasing the degree of modulation, and vice versa.

The UMTS receiver 300 may also contain multiple antennas to receive the radio signal y. The UMTS receiver 300 may contain a plurality of channel decoders 314 to be used in a MIMO (multiple input/multiple output) environment. When implementing two independent codewords, for example, the first channel decoder may decode the first codeword while the second channel decoder independently decodes the second codeword. Alternatively the UMTS receiver 300 may contain a single decoder 314 to decode both codewords, e.g. sequentially or in parallel.

Figure 4:
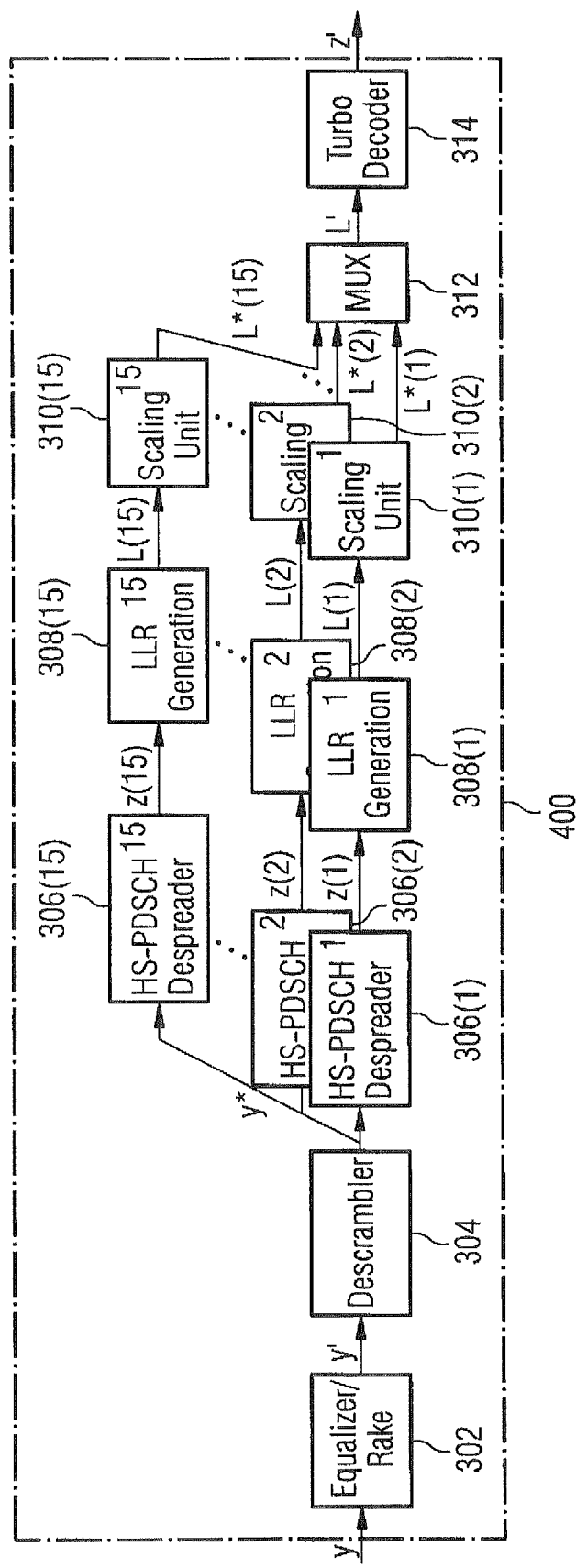
FIG. 4 schematically illustrates a UMTS receiver according to one embodiment.

FIG. 4 schematically illustrates a CDMA receiver, e.g. UMTS receiver according to one embodiment. The UMTS receiver 400 comprises an equalizer/rake unit 302, a descrambler 304, a plurality of e.g. fifteen despreaders 306(1), 306(2), ..., 306(15), a plurality of e.g. fifteen LLR generators 308(1), 308(2), ..., 308(15), a plurality of e.g. fifteen scaling units 310(1), 310(2), ..., 310(15), a multiplexer 312 and a decoder such as e.g. a turbo decoder 314.

The equalizer/rake unit 302, the descrambler 304, the plurality of e.g. fifteen despreaders 306(1), 306(2), ..., 306(15) and the turbo decoder 314 may correspond to the equalizer/rake unit 302, the descrambler 304, the plurality of e.g. fifteen despreaders 306(1), 306(2), ..., 306(15) and the turbo decoder 314 as depicted in FIG. 3. However, outputs of the despreaders 306(1), 306(2), ..., 306(15) providing respective sequences of despreaded symbols z(1), z(2), ..., z(15) are connected to a respective LLR generator 308(1), 308(2), ..., 308(15).

Each of the LLR generators 308(1), 308(2), ..., 308(15) has an input to receive a respective sequence of despreaded symbols z(1), z(2), ..., z(15) and an output, connected to a respective scaling unit of the plurality of scaling units 310(1), 310(2), ..., 310(15), to provide a respective sequence of LLR (logarithmic likelihood ratio) values L(1), L(2), ..., L(15). Each of the scaling units 310(1), 310(2), ..., 310(15) has an input to receive a respective sequence of LLR values L(1), L(2), ..., L(15) and an output, connected to a respective input of a plurality of e.g. fifteen inputs of the multiplexer 312, to provide a respective sequence of scaled LLR values L*(1), L*(2), ..., L*(15). The multiplexer 312 multiplexes the e.g. fifteen sequences of scaled LLR values L*(1), L*(2), ..., L*(15) received at its inputs and provides a sequence of multiplexed LLR values L' at its output which is connected to the turbo decoder 314. The turbo decoder 314 has an input to receive the sequence of multiplexed LLR values L' and an output to provide a sequence of code words z' by decoding the sequence of multiplexed LLR values L'.

The functionality of each of the plurality of LLR generators 308(1), 308(2), ..., 308(15) may correspond to the functionality of the LLR generator 408 as depicted in FIG. 3. The functionality of each of the plurality of scaling units 310(1), 310(2), ..., 310(15) may correspond to the functionality of the scaling unit 410 as depicted in FIG. 3. The scaling units 310(1), 310(2), ..., 310(15) scale the respective sequences of LLR values L(1), L(2), ..., L(15) by multiplying them with a scaling factor or weighting them with a weight. The scaled LLR values L*(i) for the e.g. i=1 ... 15 HS-PDSCH channels can be determined according to the equation $L^*(i)=w(i)^*L(i)$ for the first 256 chips in each slot and according to the equation $L^*(i)=L(i)$ for the remaining 2560–256 chips in the slot, wherein w(i) represents a channel-dependent weighting factor or scaling factor with a value in the interval ]0;1[. The multiplexer 312 multiplexes the soft bits of the e.g. fifteen sequences of scaled LLR values L*(1), L*(2), ..., L*(15) to a single sequence of multiplexed LLR values L' containing the code symbols to be decoded by the turbo decoder 314.

FIG. 5 schematically illustrates a redundancy version scheme of a radio signal for a HSDPA transmission according to one embodiment. The radio signal y contains a sequence of data words, wherein payload data symbols of the data words are ordered in redundancy versions. The reliability information generator 102 depicted in FIG. 1 may exploit the redundancy information for providing the reliability information 116. Also the decoder 104 may use the reliability information 116 based on the redundancy information to improve its coding performance as described below.

FIG. 5 depicts four data words 401, 402, 403, 404 ordered in different redundancy versions. The original information SYS may be mapped to first redundant information R1 and second redundant information R2 by a complex function known to the UMTS receiver 300. First redundant information R1 may contain a first part R1A, a second part R1B, a third part R1C and a fourth part R1D. Second redundant information R2 may contain a first part, a second part R2B, a third part R2C and a fourth part R2D. The original information SYS may contain a first part SYSA, a second part SYSB, a third part SYSC and a fourth part SYSD.

A first data word 401 ordered in a first redundancy version 0 contains the full original information SYS (SYSA, SYSB, SYSC and SYSD), the first part R1A of the first redundant information R1 and the first part R2A of the second redundant information R2. The first data word 401 ordered in the first redundancy version 0 is formed during a first (original) transmission. A second data word 402 ordered in a second redundancy version I contains the first part SYSA of the original information SYS, the second part R1B of the first redundant information R1 and the second part R2B of the second redundant information R2. The second data word 402 ordered in the second redundancy version I is formed during a first retransmission. A third data word 403 ordered in a third redundancy version II contains the second part SYSB of the original information SYS, the third part R1C of the first redundant information R1 and the third part R2C of the second redundant information R2. The third data word 403 ordered in the third redundancy version II is formed during a second retransmission. A fourth data word 404 ordered in a fourth redundancy version III contains the third part SYSC of the original information SYS, the fourth part R1D of the first redundant information R1 and the fourth part R2D of the second redundant information R2. The fourth data word 404 ordered in the fourth redundancy version III is formed during a third retransmission.

For each of the data words 401-404 both parts (R1A and R2A, R1B and R2B, R1C and R2C, R1D and R2D) of the first redundant information R1 and the second redundant information R2 have nearly or about the same length. When forming the data words 401-404 available bits are first filled with respective parts of the redundant information R1, R2 and afterwards free bits are filled with the respective part of the original information SYS. Depending on a retransmission being successful or unsuccessful more retransmissions may be needed which are performed by using further data words ordered in further redundancy versions. HSDPA may use up to seven retransmissions.

A total codeword CW_total contains the original information SYS (or the systematic part SYS), the first redundant information R1 (or the first parity part R1), and the second redundant information R2 (or the second parity part R1). Each of the systematic part SYS, the first parity part R1 and the second parity part R2 may contain N bits. A transmitted codeword CW_trans, e.g. one of the data words 401-404, may contain x bits of the 3N bits of the total codeword CW_total, wherein x is in the range from N to 3N.

The LLR values L(1), L(2), ..., L(15) as depicted in FIG. 3 and the LLR values L as depicted in FIG. 4 may be ordered in redundancy versions as described above for data words 401, 402, 403, 404. They may contain systematic information SYS and redundant information R1 and R2 as described below. The scaling factor w of the scaling unit 410 according to FIG. 4 or the scaling factors w(i) of the scaling units 310(1), 310(2), ..., 310(15) according to FIG. 3 may depend on the redundancy version of the LLR values. LLR values ordered in a first redundancy version (and coinciding with the interval of distortion, that is during the first 256 chips) may be attenuated to a higher degree than LLR values ordered in a second or a third redundancy version or vice versa. The scaling factor(s) w or w(i) may depend on a kind of information (systematic, first redundant, second redundant) contained in the scaled LLR values. The redundant information part of the LLR values (coinciding with the interval of distortion, that is during the first 256 chips), for example, may be attenuated to a higher degree than the systematic information part of the same LLR values or vice versa. The first redundant information part of the LLR values (coinciding with the interval of distortion, that is during the first 256 chips), for example, may be attenuated to a higher degree than the second redundant information part of the same LLR values. A higher attenuation corresponds to a smaller (positive or negative) magnitude of w or w(i) such that a multiplication with w or w(i) results in a smaller magnitude of the result which corresponds to a higher attenuation.

FIG. 6 schematically illustrates a block diagram of a turbo decoder according to one embodiment. The turbo decoder 600 may correspond to the decoder 104 depicted in FIG. 1 or to the turbo decoders 314 depicted in FIGS. 3 and 4. The turbo decoder 600 includes a first convolutional decoder 602 and a second convolutional decoder 604, both of which work on the same block of information bits including systematic information 606, first parity (redundant) information 608 and second parity (redundant) information 609.

As described above, the scaled LLR values L' as depicted in FIGS. 3 and 4 may be ordered in redundancy versions containing systematic information SYS and redundant information R1 and R2 according to FIG. 5. The systematic information SYS depicted in FIG. 5 may correspond to the systematic information 606 depicted in FIG. 6. The first redundant information R1 depicted in FIG. 5 may correspond to the first parity information 608 depicted in FIG. 6. The second redundant information R2 depicted in FIG. 5 may correspond to the second parity information 609 depicted in FIG. 6.

The first convolutional decoder 602 receives the systematic information 606 at a first input 602a, the first parity information 608 at a second input 602b and first extrinsic LLR (logarithmic likelihood ratio) information 610 at a third input 602c. The first convolutional decoder 602 provides first APP (a posteriori probability) LLR (logarithmic likelihood ratio) information 612 at an output 602d of the first convolutional decoder 602. A first adder 614 adds the inverse systematic information 606, the inverse first extrinsic LLR information 610 and the first APP LLR information 612 to provide first added information which is multiplied by a first weighting factor $w_1$ obtaining second extrinsic LLR information 616 which is received at a third input 604c of the second convolutional decoder 604. A first input 604a of the second convolutional decoder 604 receives the systematic information 606 interleaved by an interleaver Π. A second input 604b of the second convolutional decoder 604 receives the second parity information 609. The second convolutional decoder 604 provides second APP LLR information 618 at an output 604d of the second convolutional decoder 604. A second adder 620 adds the systematic information 606 being interleaved by the interleaver Π and inverted, the inverse second extrinsic LLR information 616 and the second APP LLR information 618 to provide second added information which is multiplied by a second weighting factor $w_2$ and deinterleaved by a deinterleaver $\Pi^{-1}$ obtaining the first extrinsic LLR information 610 which is received at the third input 602c of the first convolutional decoder 602.

Optionally a soft mapper 622 performs a soft mapping operation on the second APP LLR information 618 to provide soft-coded output information 624 at an output of the turbo decoder 600. The mapping of the soft mapper 622 may depend on a redundancy version (RV) in which the codeword containing the systematic information 606 and the parity (redundant) information 608, 609 is coded. Alternatively the second APP LLR information 618 may be provided at the output of the decoder 600 as hard-coded output information.

Decoding of the turbo decoder 600 is an iterative process with the exchange of reliability information. In every iteration each convolutional decoder 602, 604 calculates for every received bit a LLR (log-likelihood ratio) as soft-output (reliability information). The soft output of each convolutional decoder 602, 604 is modified to reflect only its own confidence in the received information bit. The sign of each LLR indicates the received information bit of being sent either as "−1" or "+1", the absolute values are measures of confidence in the respective −1/+1 decision. The convolutional decoders 602, 604 may be maximum a posteriori (MAP) decoders.

FIG. 7 shows a diagram schematically illustrating data throughput versus signal-to-noise ratio depending on a distortion power for a UMTS receiver according to one embodiment. The curves show the effectiveness in case of different SCH power settings for an AWGN (additive white gaussian noise) channel with a signal-to-noise ratio Ior/Ioc of 50 dB. A number of 5 HS-PDSCH channels is used corresponding to a UMTS receiver 300 having 5 instead of 15 HS-PDSCH channels as depicted in FIG. 3. The modulation scheme is a 16QAM constellation. A transport block length (TBL) is 8125. For a 16QAM constellation there are 640 bits per slot of the HS-PDSCH channel according to the 3GPP TS 25.211 specification. One slot of the HS-PDSCH channel is depicted in FIG. 2. With a number of 15 slots per frame of an HS-PDSCH channel the HS-PDSCH frame has a length of 9600 bits. The transport block length corresponds to the number of systematic bits per HS-PDSCH frame. A code rate is determined as the ratio of the number of systematic bits (TBL=8125) and total number of bits (=9000) per HS-PDSCH frame. This ratio is 0.846 for the diagram depicted in FIG. 7. The scaling factors w(i) associated with the i=5 HS- PDSCH channels are equally set to w=0.75 which corresponds to an attenuation by a factor of 0.25.

For a first curve 701 an SCH power setting of −12 dB and no correction of distortion, i.e. weights w(i) are set to 1, is used. The data throughput (TP) decreases from 4000 kbps to 2000 kbps when reducing the signal-to-noise ratio Ec/Ior from −6.5 dB to −8.5 dB. A second curve 702 depicts the behavior when a distortion correction (corr) is used with a weighting factor of w=0.75. The data throughput is not decreasing until reducing the signal-to-noise ratio Ec/Ior below −11 dB.

For a third curve 703 an SCH power setting of −15 dB and no correction of distortion is used. The data throughput (TP) decreases from 4000 kbps to 2000 kbps when reducing the signal-to-noise ratio Ec/Ior from −9 dB to −11 dB. A fourth curve 704 depicts the behavior when a distortion correction (corr) is used with a weighting factor of w=0.75. No decreasing of data throughput can be seen in the depicted signal-to-noise ratio Ec/Ior range from −5 dB to −12 dB.

For a fifth curve 705 an SCH power setting of −18 dB and no correction of distortion is used. The data throughput (TP) starts decreasing from 4000 kbps when reducing the signal-to-noise ratio Ec/Ior below −11 dB. A sixth curve 706 depicts the behavior when a distortion correction (corr) is used with a weighting factor of w=0.75. No decreasing of data throughput can be seen in the depicted signal-to-noise ratio Ec/Ior range from −5 dB to −12 dB.

FIG. 7 shows that with a scaling of w=0.25 (corr) the decoding performance increases by about 4.5 dB.

FIG. 8 shows a diagram schematically illustrating data throughput versus signal-to-noise ratio depending on a weight of the LLR for a UMTS receiver according to one embodiment. The measurement scenario corresponds to that of FIG. 7 with the difference that a SCH power setting of −12 dB is used for all curves and that the weights w are varied.

For a first curve 801 a weight of 1.0, i.e. no weighting, is used. The data throughput (TP) decreases from 4000 kbps to 2000 kbps when reducing the signal-to-noise ratio Ec/Ior from −7 dB to −8.5 dB. For a second curve 802 a weight of 0.9, i.e. attenuation of 0.1, is used. The data throughput (TP) decreases from 4000 kbps to 2000 kbps when reducing the signal-to-noise ratio Ec/Ior from −7.1 dB to −9 dB. For a third curve 803 a weight of 0.8, i.e. attenuation of 0.2, is used. The data throughput (TP) decreases from 4000 kbps to 2000 kbps when reducing the signal-to-noise ratio Ec/Ior from −7.5 dB to −9.5 dB.

A fourth curve 804, fifth curve 805, sixth curve 806, seventh curve 807, eighth curve 808, ninth curve 809 and tenth curve 810 illustrates the throughput performance when using weights of 0.7, 0.6, 0.5, 0.4, 0.3, 0.2 and 0.1. The range of throughput reduction is shifted from higher signal-to-noise ratios to lower signal-to-noise ratios with decreasing weights.

From the ten curves depicted in FIG. 8 the curve 810 corresponds to the best throughput which is obtained when using a weight of 0.1. FIG. 8 shows that a weighting factor of w=0.1 increases the decoding performance even more than 4.5 dB.

A method for distortion-robust decoding of code symbols which are interfered with a distortion during a predetermined time interval of distortion includes providing of reliability information based on the code symbols and a decoding of the code symbols into code words. The decoding is such that the weighted reliability information is generated from the reliability information by applying a first weight during times not coinciding with the distortion time interval and by applying a second weight different from the first weight during times coinciding with the distortion time interval.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it should be understood that embodiments of the invention may be implemented in discrete circuits, partially integrated circuits or fully integrated circuits or programming means. Also, the terms "exemplary", "for example" and "e.g." are merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

Although specific embodiments have been illustrated and described herein, it will be appreciated by those of ordinary skill in the art that a variety of alternate and/or equivalent implementations may be substituted for the specific embodiments shown and described without departing from the scope of the present invention. For instance, implementations described in the context of a UMTS receiver could be applied to CDMA receivers or to mobile communication receivers relating to other technical standards such as e.g. GSM or derivatives thereof or applying other multiple access schemes such as e.g. TDMA, FDMA etc. This application is intended to cover any adaptations or variations of the specific embodiments discussed herein. Therefore, it is intended that this invention be limited only by the claims and the equivalents thereof.

What is claimed is:

1. A device for decoding code symbols which are interfered with a distortion during a distortion time interval, comprising:
   a reliability information generator configured to provide reliability information based on the code symbols; and
   a decoder configured to decode the code symbols into code words based on weighted reliability information,
   wherein the weighted reliability information is generated from the reliability information by applying a first weight to the reliability information during times not coinciding with the distortion time interval and by applying a second weight different from the first weight to the reliability information during times coinciding with the distortion time interval,
   wherein the distortion time interval is periodic.

2. The device of claim 1, wherein the reliability information is provided for each bit of the code symbols as a number having a sign that indicates a state of the bit, and a magnitude that indicates a reliability of the bit for being in the indicated state.

3. The device of claim 1, wherein the reliability information comprises one of a likelihood information, a log likelihood ratio and a probability.

4. The device of claim 1, wherein the distortion is or is caused by a synchronization signal comprising a sequence of synchronization symbols, wherein a relative position of the synchronization symbols with respect to the code symbols is configurable.

5. The device of claim 1, wherein the decoder comprises one of a turbo decoder, a LDPC decoder, a convolutional decoder, a decoder comprising an interleaver and a decoder exploiting reliability information.

6. The device of claim 1, wherein the second weight is smaller than the first weight.

7. The device of claim 1, wherein the first weight or the second weight, or both, depend on a code rate of the code symbols.

8. The device of claim 7, wherein a ratio of the second weight and the first weight is increased when increasing the code rate.

9. The device of claim 1, wherein the first weight or the second weight, or both, depend on a modulation constellation scheme of the code symbols.

10. The device of claim 9, wherein a ratio of the second weight and the first weight is smaller for higher degrees of a modulation constellation scheme than for lower degrees of the modulation constellation scheme.

11. The device of claim 9, wherein the modulation comprises one or more of a QPSK, 16QAM, 64QAM and 256QAM.

12. The device of claim 1, further comprising:
an equalizer configured to equalize a radio signal received by the device, thereby providing an equalized signal;
a demodulator configured to demodulate the equalized signal, thereby providing demodulated symbols;
a descrambler configured to descramble the demodulated symbols, thereby providing descrambled symbols; and
a despreader configured to despread the descrambled symbols, thereby providing the code symbols to the decoder.

13. A method for distortion-robust decoding of code symbols which are interfered with a distortion during a distortion time interval, comprising:
providing reliability information based on the code symbols; and
decoding the code symbols into code words based on weighted reliability information,
wherein the weighted reliability information is generated from the reliability information by applying a first weight during times not coinciding with the distortion time interval, and by applying a second weight different from the first weight during times coinciding with the distortion time interval,
wherein the distortion time interval is periodic.

14. The method of claim 13, wherein the reliability information is provided for each bit of the code symbols as a number having a sign that indicates a state of the bit, and having a magnitude that indicates a reliability of the bit for being in the indicated state.

15. The method of claim 13, wherein the reliability information comprises one of a log likelihood ratio and a probability.

16. The method of claim 13, wherein the distortion is or is caused by a synchronization signal comprising a sequence of synchronization symbols.

17. The method of claim 13, wherein the second weight is smaller than the first weight.

18. The method of claim 13, wherein the first weight or the second weight, or both, depend on a code rate of the code symbols.

19. The method of claim 18, wherein a ratio of the second weight and the first weight is increased when increasing the code rate.

20. The method of claim 13, wherein the first weight or the second weight, or both, depend on a modulation constellation scheme of the code symbols.

21. The method of claim 20, wherein a ratio of the second weight and the first weight is smaller for higher degrees of the modulation constellation scheme than for lower degrees of the modulation constellation scheme.

* * * * *